(12) United States Patent
Kataoka et al.

(10) Patent No.: US 7,716,319 B2
(45) Date of Patent: May 11, 2010

(54) COMPUTER SYSTEM AND METHOD FOR MANAGING LOG INFORMATION

(75) Inventors: Kenji Kataoka, Yokohama (JP); Koji Sonoda, Sagamihara (JP); Yoji Nakatani, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 915 days.

(21) Appl. No.: 11/297,357

(22) Filed: Dec. 9, 2005

(65) Prior Publication Data

US 2007/0100980 A1 May 3, 2007

(30) Foreign Application Priority Data

Nov. 1, 2005 (JP) ............................. 2005-318721

(51) Int. Cl.
*G06F 15/173* (2006.01)
(52) U.S. Cl. ................. 709/223; 707/999.3; 707/999.8; 707/999.2; 707/999.201; 707/999.202; 709/224; 714/E11.13
(58) Field of Classification Search .................. None
See application file for complete search history.

(56) References Cited

U.S. PATENT DOCUMENTS

| 6,470,388 | B1 | 10/2002 | Niemi et al. |
| 6,931,449 | B2 * | 8/2005 | Schmidt et al. ............. 709/228 |
| 6,934,799 | B2 * | 8/2005 | Acharya et al. ............. 711/112 |
| 7,356,679 | B1 * | 4/2008 | Le et al. ......................... 713/1 |
| 2003/0110237 | A1 * | 6/2003 | Kitamura et al. ............ 709/219 |
| 2005/0055402 | A1 * | 3/2005 | Sato ............................ 709/205 |
| 2005/0086193 | A1 * | 4/2005 | Bolstad et al. ................. 707/1 |

OTHER PUBLICATIONS

C. Loovick et al., "RFC 3164 (RFC3164)—The BSD Syslog Protocol", Network Working Group, Informational, Aug. 2001, 21 pages.

* cited by examiner

*Primary Examiner*—Don Wong
*Assistant Examiner*—Shyue Jiunn Hwa
(74) *Attorney, Agent, or Firm*—Foley & Lardner LLP (57) ABSTRACT

A computer system for managing log information, enabling correct comprehension of system logs for an identical resource before and after migration among plural nodes. A global ID, being unique in the system, is given to a resource (LU) migrated from one file share server to another. The global ID remains the same in the migration destination file share server after migration and log messages for the resource are obtained based on the global ID.

8 Claims, 12 Drawing Sheets

| LU NUMBER | FILE SYSTEM ID | GLOBAL ID | MOUNT POINT |
|---|---|---|---|
| 1 | 1 | 192.168.1.1.1 | / |
| 2 | 2 | 192.168.1.1.2 | /home |
| ⋮ | ⋮ | ⋮ | ⋮ |

| TIME | HOST NAME | GLOBAL ID | MESSAGE | |
|---|---|---|---|---|
| 20:10 | server2 | 192.168.1.2.2 | LU2 I/O RETRY (ONCE) | ⎱ PRE-MIGRATION |
| 20:12 | server2 | 192.168.1.2.2 | LU2 I/O RETRY (TWICE) | ⎰ |
| ... | | | | |
| 20:45 | server1 | 192.168.1.2.2 | LU3 I/O RETRY (THREE TIMES) | } POST-MIGRATION |

SEARCH CRITERIA

SPECIFIED TIME     20:00～21:00

SPECIFIED HOST     server1

SPECIFIED RESOURCE     LU3

OBTAIN RELEVANT LOG    ◉ YES     ○ NO

SEARCH LOG MESSAGE

| TIME | HOST NAME | GLOBAL ID | MESSAGE | |
|---|---|---|---|---|
| 20:10 | server2 | 192.168.1.2.2 | LU2 | I/O RETRY (ONCE) |
| 20:12 | server2 | 192.168.1.2.2 | LU2 | I/O RETRY (TWICE) |
| ⋮ | | | | |
| 20:45 | server1 | 192.168.1.2.2 | LU3 | I/O RETRY (THREE TIMES) |

FIG.12

COMPUTER SYSTEM AND METHOD FOR MANAGING LOG INFORMATION

CROSS REFERENCES TO RELATED APPLICATIONS

This application relates to and claims priority from Japanese Patent Application No. 2005-318721, filed on Nov. 1, 2005, the entire disclosure of which is incorporated herein by reference.

BACKGROUND OF THE INVENTION

The present invention relates to a computer system and a method for managing a system log when a resource mapped onto a node is migrated from one node to another.

Lately, with the dramatic increase in the amount of data managed in information systems, storage network technology has been widely used. In one example of a storage network, plural file share servers (NAS) are connected to a common storage apparatus via a Storage Area Network (SAN). A file share server is also connected to plural host computers via a Local Area Network (LAN). The host computers having heterogeneous operating systems (OS) can share files via file systems in the file share servers.

A storage apparatus provides storage resources, i.e., logical units to the file systems of the file share servers. When a file share server accesses a logical unit, it creates system log information. UNIX (registered trademark) type OS comes equipped with, as a conventional log management system, syslog daemon, which is regulated by Request for Comments (RFC) and used for obtaining and managing system logs. The syslog daemon is a daemon having functions for supporting programs to create logs. Using the syslog daemon helps to lighten the log management load on various programs.

A non-patent document, "The BSD Syslog Protocol" (written by C. Lonvick describes a means for formatting and centrally-managing log messages, and a means for obtaining logs and specifying storage locations/output locations for the logs based on information types (categories) and severity of the logs. A similar conventional technique for centrally-managing logs from applications distributed on a network is suggested in U.S. Pat. No. 6,470,388 B1.

SUMMARY OF THE INVENTION

When a file share server obtains a system log, resource (logical unit)-identifying IDs set for each log message are set and managed individually and separately by the respective file share servers. Accordingly, when a resource is migrated from one node to another by switching the path to the resource among the file share servers, although the substance of the resource itself is not changed, the ID for identifying the resource changes in the migration destination node (file share server). Accordingly, logs for the resource before migration and logs for the same resource after migration are managed using different IDs. In other words, it is difficult to follow the different IDs for the resource and obtain all their log information.

Thereupon, it is one aspect of the present invention to provide a computer system for managing log information, whereby system logs for a resource can be accurately followed before and after migration of the resource among nodes. Another aspect of the present invention is to provide a method for managing the log information.

In order to solve the above problem and to achieve the above objects, the present invention is characterized in that a resource is given an ID that is and remains unique in a system before and after migration.

Specifically, the first aspect of the present invention provides a computer system having: a plurality of nodes; a resource corresponding to the node; a resource management module for giving a unique ID to the resource and managing the resource while maintaining the unique ID when the resource having the unique ID is migrated from one node to another; and a log management module for associating log information with the unique ID and managing log information for the same resource before and after migration using the unique ID.

Second aspect of the present invention provides a computer system having: a file share server having file systems shared between host computers; a storage apparatus for providing logical units to the file share server; a path connection module for setting paths between logical units and file systems so that a logical unit can be migrated from one file system to another; a management module for giving a global ID to a logical unit and managing the logical unit while maintaining the global ID when the logical unit is migrated from one file system to another file system; and a log management module for associating log information for a logical unit with a global ID and managing the log information for the same logical unit in a migration source file system and log information for the same logical unit in a migration destination file system using the global ID.

Third aspect of the present invention provides a method for managing log information including the steps of: mounting a resource on a node; giving a unique ID to the resource and migrating the resource having the unique ID from one node to another; maintaining the unique ID of the resource when migrating the resource; and associating log information with the unique ID and managing the log information for the same resource before and after migration using the unique ID.

According to the present invention, log information for a resource is associated with a specified ID that does not change before or after migration of the resource from one node to another.

As explained, according to the present invention, an effect where system logs for an identical resource can be accurately followed before and after migration of the resource among nodes can be achieved.

DETAILED DESCRIPTION OF THE INVENTION

Figure 1:
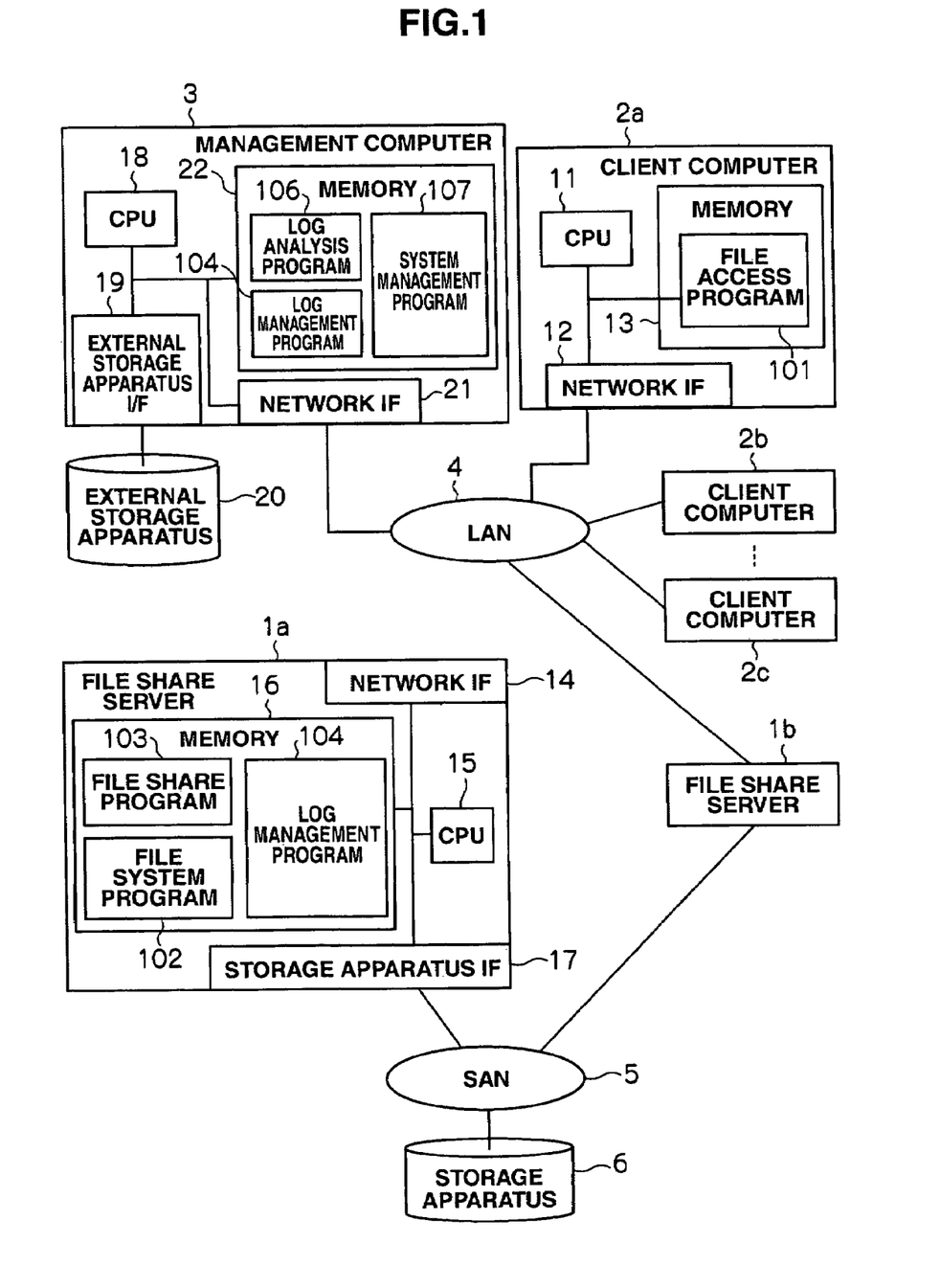
FIG. 1 is a system block diagram showing an example of a computer system according to the first embodiment of the present invention.

An embodiment of the present invention is described below with reference to the attached drawings. FIG. 1 shows an example of a computer system for managing log information according to an embodiment of the present invention. Each of client computers 2a, 2b, and 2c includes a processor 11 (hereinafter called the "CPU"), a network interface control unit 12 (hereinafter called the "network I/F") connected to a LAN 4, and memory 13, all connected to one another via internal communication channels to enable communication. A file access program 101 stored in the memory 13 is a program that is run by the CPU 11 to access the respective file systems managed by the file share servers 1a . . . 1b.

Each of the file share servers 1a and 1b has a network I/F 14, a CPU 15, memory 16, and a storage apparatus interface control unit (hereinafter called the "storage apparatus I/F") 17 for connection with a SAN 5, all connected to one another via internal communication channels to enable communication.

Memory 16 stores a file system program 102, a file share program 103, and a log management program 104, that are run by the CPU 15.

When the file share program 103 receives a request via the network I/F 14 from the client computer 2a, 2b, or 2c, it analyzes the type of request and issues a file I/O request to the file system program 102. The file system program 102 converts the file I/O request to a block I/O request, which is a request for block I/O to a disk in a storage apparatus 6, and transmits it to the storage apparatus I/F 17.

Then, the file system program 102 receives a reply from the storage apparatus I/F 17 and delivers it to the file share program 103. The file share program 103 transmits the reply via the network I/F 14 to the client computers 2a, 2b and 2c, thereby making it possible to share a file among the clients with different OSs.

The log management program 104 receives log messages created by the file share program 103 and the file system program 102 and transfers them to a management computer 3 via the LAN 4.

Incidentally, as instructed by the management computer 3, the file system program 102 performs LU path setting and file system creation, described later in detail.

The file share servers 1a and 1b and the storage apparatus 6 are connected to one another via the SAN 5 to enable communication. The storage apparatus 6 achieves high-speed response by bundling physical disk drives and provides a large number of logical units (hereinafter called the "LU") to the file share servers 1a and 1b. By setting paths between LUs and the file share servers 1a and 1b, the file share servers 1a and 1b see the LUs as a single block device and so can access the storage apparatus by block I/O.

The management computer 3 has a CPU 18, a network I/F 21 connected to the LAN 4, an external storage apparatus interface control unit (hereinafter called the "external storage apparatus I/F") 19 connected to an external storage apparatus 20, and memory 22, all connected to one another via internal communication channels to enable communication. The memory 22 stores a log management program 104, a log analysis program 106, and a system management program 107, that are run by the CPU 18.

The log management program 104 performs processing to store log messages transferred from the file shared servers 1a and 1b in the external storage apparatus 20. The log analysis program 106 is used by an administrator to analyze the log messages stored in the external storage apparatus 20. The system management program 107 is used by the administrator to instruct the file share servers 1a and 1b to perform LU path setting, file system creation/mounting, file share setting and migration.

Processing performed after assignment of LUs in the storage apparatus 6 to the file share servers 1a and 1b and before file share setting is explained below.

The administrator instructs the file share servers 1a and 1b to set paths between the LUs in the storage apparatus 6 and the file share servers, create file systems, mount the file systems, and make file share settings using the system management program 107 in the management computer 3.

In each of the file share servers 1a and 1b, the file system program 102 sets, in the storage apparatus 6, paths between the file share servers and the LUs and gives the LUs LU numbers that are unique in the file share servers 1a and 1b. It also gives the LUs, for which the paths have been set, global IDs that are unique in the system.

The global IDs are created by adding ID numbers that are unique in the file share servers 1a and 1b to IP address information for the file share servers 1a and 2b, but they may also be created using MAC addresses instead of the IP addresses. Alternatively, it is also possible to use apparatus IDs that are assigned to the file share servers 1a and 1b and unique in the system shown in FIG. 1.

Next, the file system program 102 creates file systems using the LUs for which the paths have been set, and gives file system IDs to the file systems, the IDs being unique in the file share servers 1a and 1b. Incidentally, in the present embodiment, one file system is created for one LU.

Figure 2:
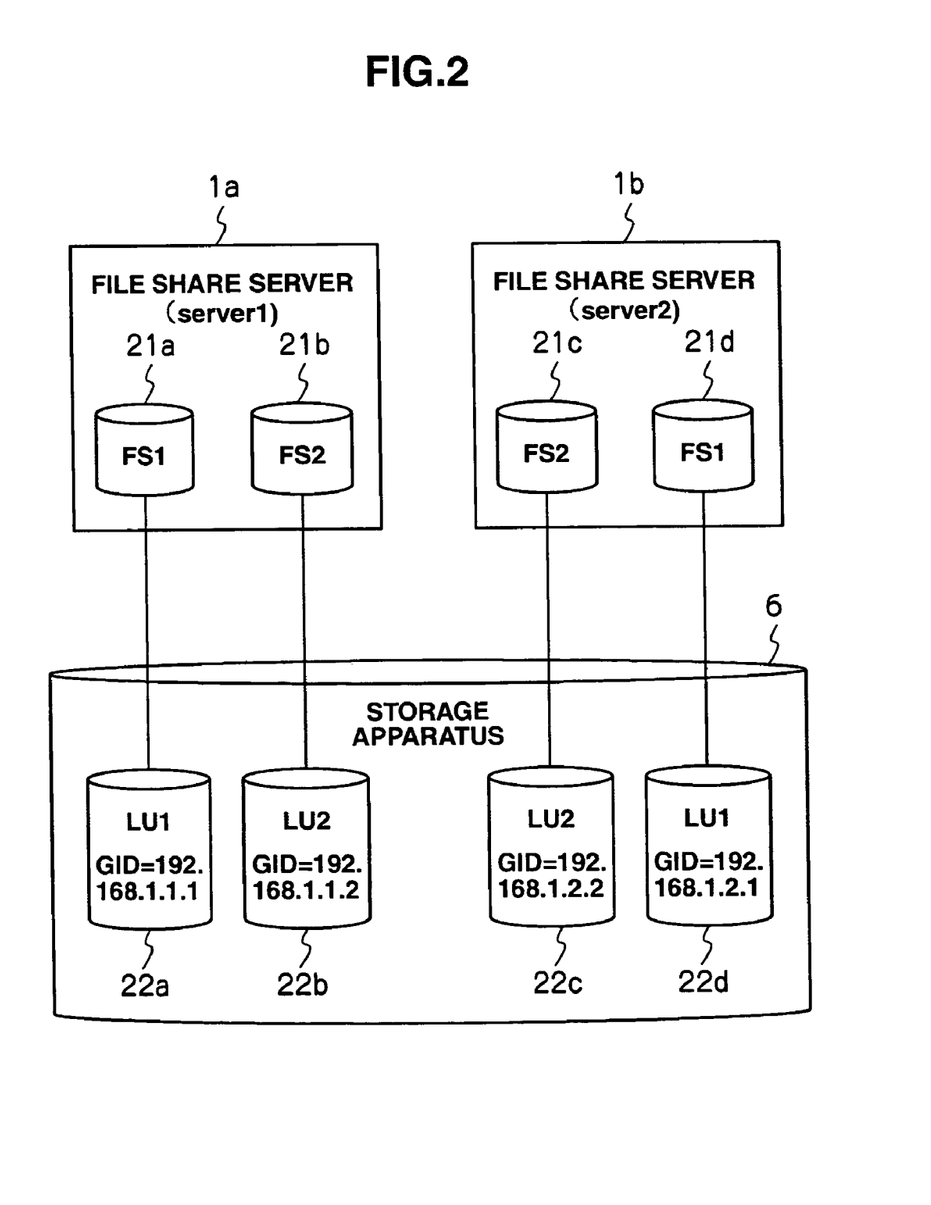
FIG. 2 is a block diagram showing an example of LU path setting.

As shown in FIG. 2, two file systems having the respective file system IDs 1 and 2 are created in the file share server 1a. An LU having an LU number 1 and a global ID (GDI) 192.168.1.1.1 is formed for one file system, and an LU having an LU number 2 and a global ID 192.168.1.1.2 is formed for the other file system.

Also, in the file share server 1b, two file systems having file system IDs 1 and 2 are created. An LU having an LU number 1 and a global ID 192.168.1.2.1 is formed for one file system, and an LU having an LU number 2 and a global ID 192.168.1.2.2 is formed for the other file system.

The file system program 102 specifies mount points for the created file systems 21a to 21d and performs mount processing. A mount point is a point in a directory tree for the connected client computers and the file share servers 1a and 1b. When the file share program finally specifies mount points and makes export settings, file share settings become open to the client computers.

Figure 3:
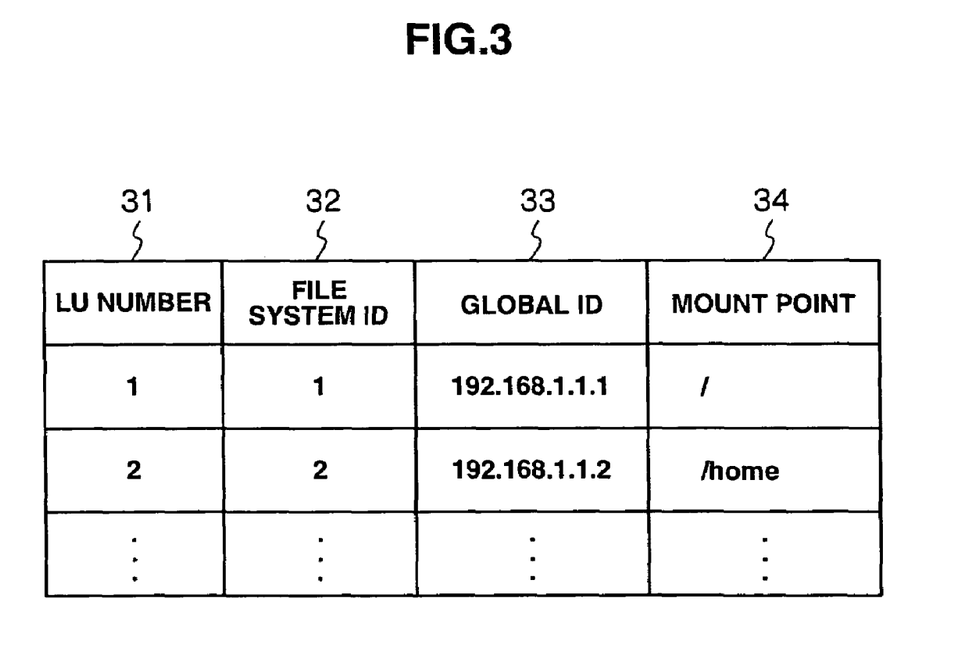
FIG. 3 is a file system management table.

The information on the given IDs and settings is managed by the file system program using a file system management table shown in FIG. 3 and the file share program 103 is referred to in response to file access requests from the client computers 2a, 2b and 2c. The management table in FIG. 3 is stored in local memory in the file share servers.

Figure 4:
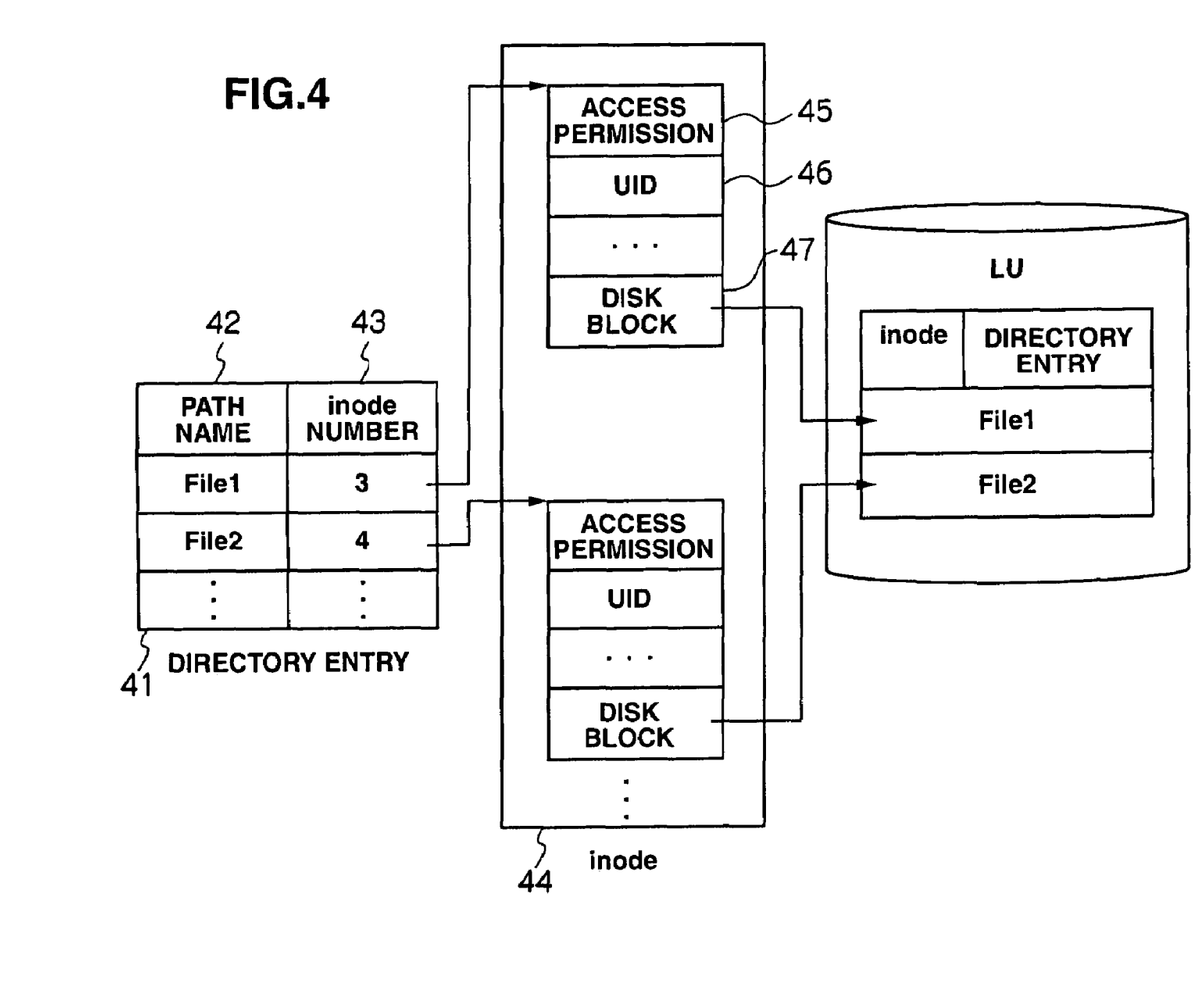
FIG. 4 shows a table showing directory entry and inode.

The file system program 102 also manages, for each file system, directory entry 41 and inode information 44 shown in FIG. 4 in order to manage files stored in the file systems or directory information.

The directory entry 41 includes path names 42 for directories or files belonging to file systems and inode numbers 43 assigned to the directories or files.

An inode specified by an inode number is information indicating an address of a storage area storing the inode information for a file or directory. Inode information for each directory or file includes an access permission 45, UID information 46 for a user who owns the directory or file, and a disk block address 47, etc.

The disk block address 47 is information indicating a storage area in the storage apparatus 6, in which data of a file or directory specified by the disk block address is actually stored. The flow of processing performed after transmission of a request from the client computer 2a, 2b, or 2c to the file share servers 1a and 1b and before reception of a result as a response is explained below.

In each of the client computers 2a, 2b, and 2c, which are host computers, the file access program 101, which performs mount processing for file systems exported by the file share servers, receives the path name for an access target file or directory and an access request including the content of processing to be executed by the file share servers 1a and 1b for the file or directory from the user, and transmits the request to the file share servers 1a and 1b.

Examples of an access request include requests for file creation, directory creation, attribution change, data writing in a file, and data reading from a file, etc. In the present example, explanations are given for the cases where access requests request data writing to a file and data reading from a file.

The file access program 101 transmits the path name of a file to the file share servers 1a and 1b and obtains a file handle. It then specifies a file handle value and transmits a request to the file share servers 1a and 1b. A file handle is a value created by the file share program 103 to specify a file or directory.

A file handle is created using, for example, a file system ID and an inode number. Accordingly, the file share program 103 can obtain a target file system ID and an inode number from the file handle contained in the request from the client computer 2a, 2b or 2c. It then makes a request to the file system program by specifying the file system ID and the inode number.

The file system program 102 specifies an access target's LU number and block address based on the file ID and the inode number contained in the request and performs reading or writing processing to the storage apparatus I/F 17.

The file system program 102 returns the data sent from the storage apparatus via the storage apparatus I/F 17 to the file share program 103; Subsequently, the file share program 103 returns the data to the client computer 2a, 2b or 2c via the network I/F 14.

The processing above enables the client computers to access, via the LAN, file systems, for which export is set for the client computers, in the same manner as they access local file systems.

The file share program 103 and the file system program 102 perform processing to obtain log information, which is necessary when recovering from disk failure in the storage apparatus 6, as well as making changes in the logical structures of disks. Specifically, they create and transmit log messages to the log management program using self-node internal communication.

Figure 5:
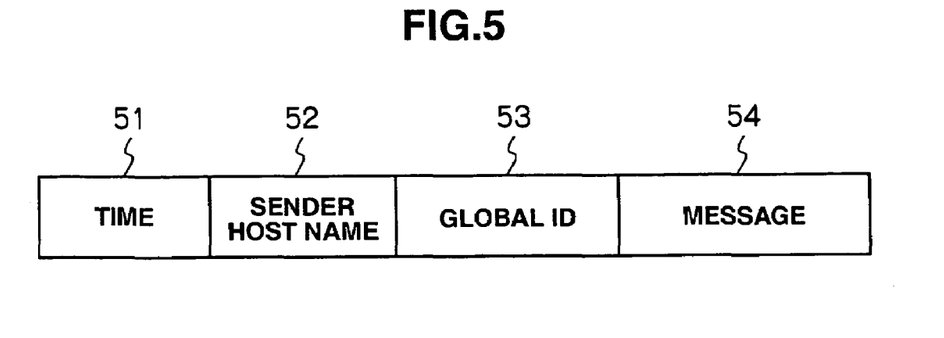
FIG. 5 is a format for a log message.

FIG. 5 shows a format of a log message. A log message includes: an area 51 where the acquisition time of a request from a client computer is entered; an area 52 where a name of a log-sending client computer is entered; an area 53 where a global ID is entered; and an area 54 where the log message to be set in memory is entered. Incidentally, in the global ID-setting area, the value given to a target LU is set when the log is obtained.

The log management program 104 is run in the file share servers 1a and 1b and the management computer 3; however, the operation content varies between them. In the file share servers 1a and 1b, the log management program 104 performs processing to transfer received log messages to the management computer 3, whereas in the management computer 3, it performs processing to store the received log messages in the local memory 20. These operations are designated by parameters at start-up.

Figure 6:
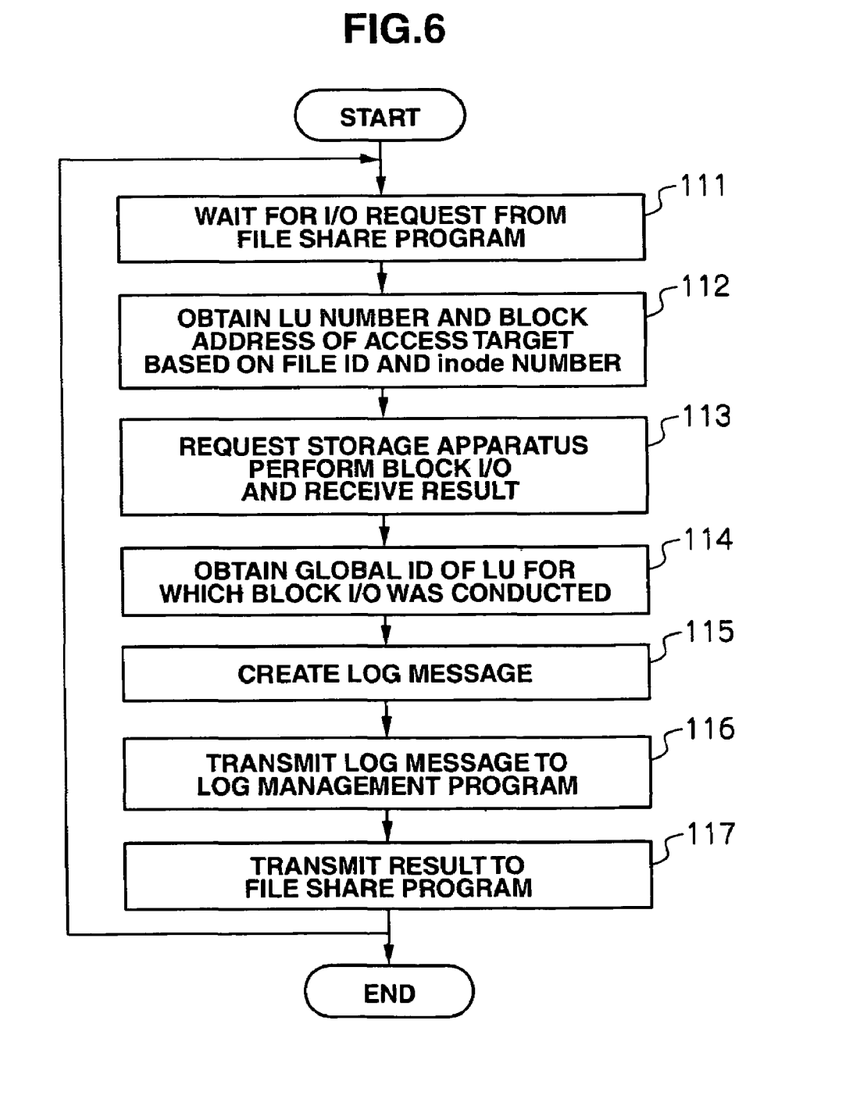
FIG. 6 is an operation flow for a file system program.

FIG. 6 shows an operation flow for the aforementioned file system program 102. The file system program waits for a file I/O request from the file share program (step 111), obtains an access target's LU number and block address-according to a file ID and an inode number contained in the file I/O request (step 112), and makes a block I/O request to the storage apparatus, and receives a result (step 113).

The file system program obtains the global ID of the LU for which the block I/O was conducted (step 114), creates a log message and associates the message with the global ID (step 115 and 116). It then notifies the file share program of the result (step 117) and returns to step 111.

Figure 7:
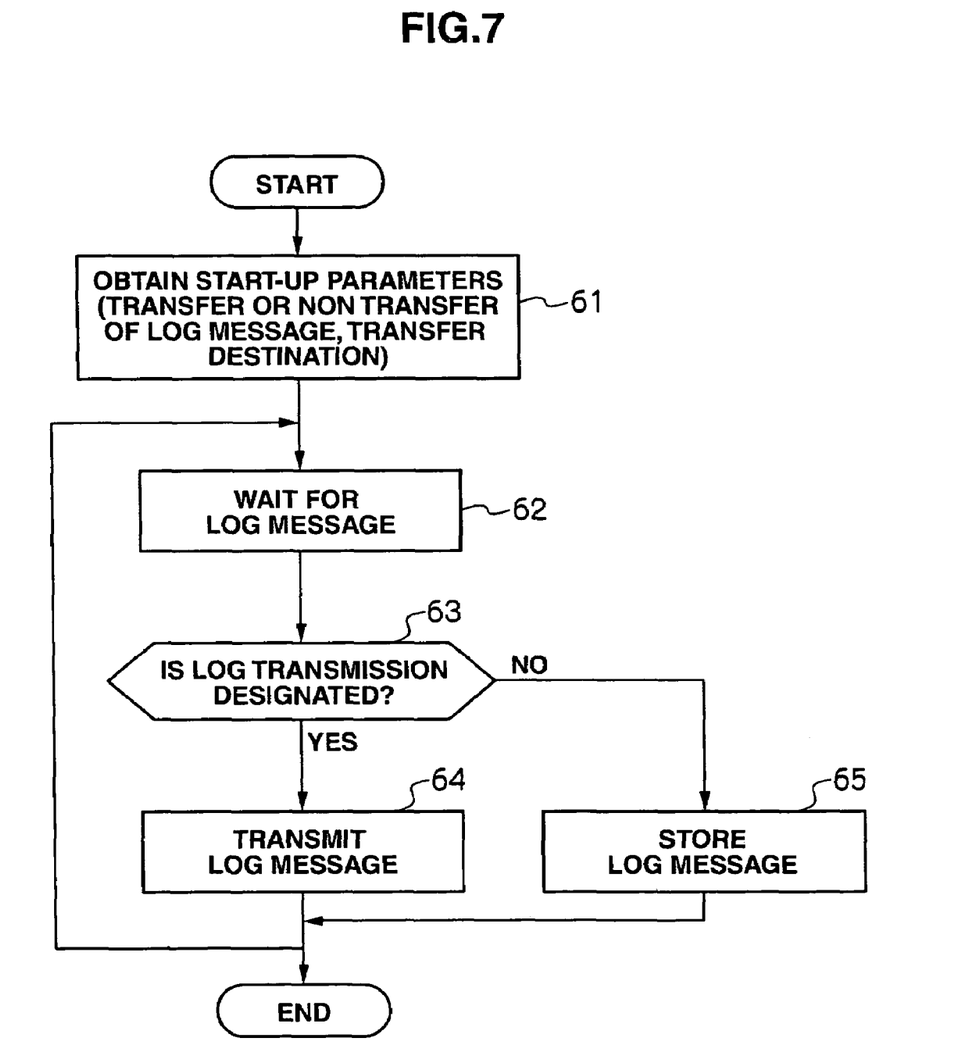
FIG. 7 is an operation flow for a log management program.

An operation flow for the log management program 104 is explained with reference to FIG. 7. First, the log management program checks start-up parameters to decide whether or not to transfer a log message to the management computer 3, and if it decides to transfer the same thereto, it obtains the IP address of the management computer (step 61) and waits for a log message (step 62).

When the log management program receives a log message, it checks the start-up parameters to judge whether log transmission has been ordered (step 63), performs processing to transfer the log message- to the specified transmission destination (step 64), or performs processing to write the log message in the external storage apparatus 20 via the external storage apparatus I/F 19 (step 65). Through the processing, the log management program collects log messages from the file share servers 1a and 1b in the management computer 3 and stores them in memory.

Migration of an LU among file systems is explained with reference to FIG. 8. The management computer 3 checks loads on the CPUs in the file share servers 1a and 1b. If there is a gap between their loads, the management computer 3 migrates an LU in a file system in the file share server with a heavy CPU load to a file system in the file share server with a lighter CPU load so that their. CPU loads are averaged and the response to the client computers can be quickened.

Migration of an LU is ordered by the management computer 3 to the file system program in the file share servers 1a and 1b. The LU's file system and a LU path are deleted in a migration source file share server, while in a migration destination file share server, LU path setting, file system creation, mount processing and file share setting are performed.

A plurality of file systems together form a common name space. Accordingly, as shown in FIG. 8, a client computer can access the logical unit 22c via the file share server 1a with the light CPU load rather than via the file share server 1b with the heavy CPU load. Whereas, if the file systems form name spaces in each file share server, the client computers perform remount processing for the file systems.

Figure 8:
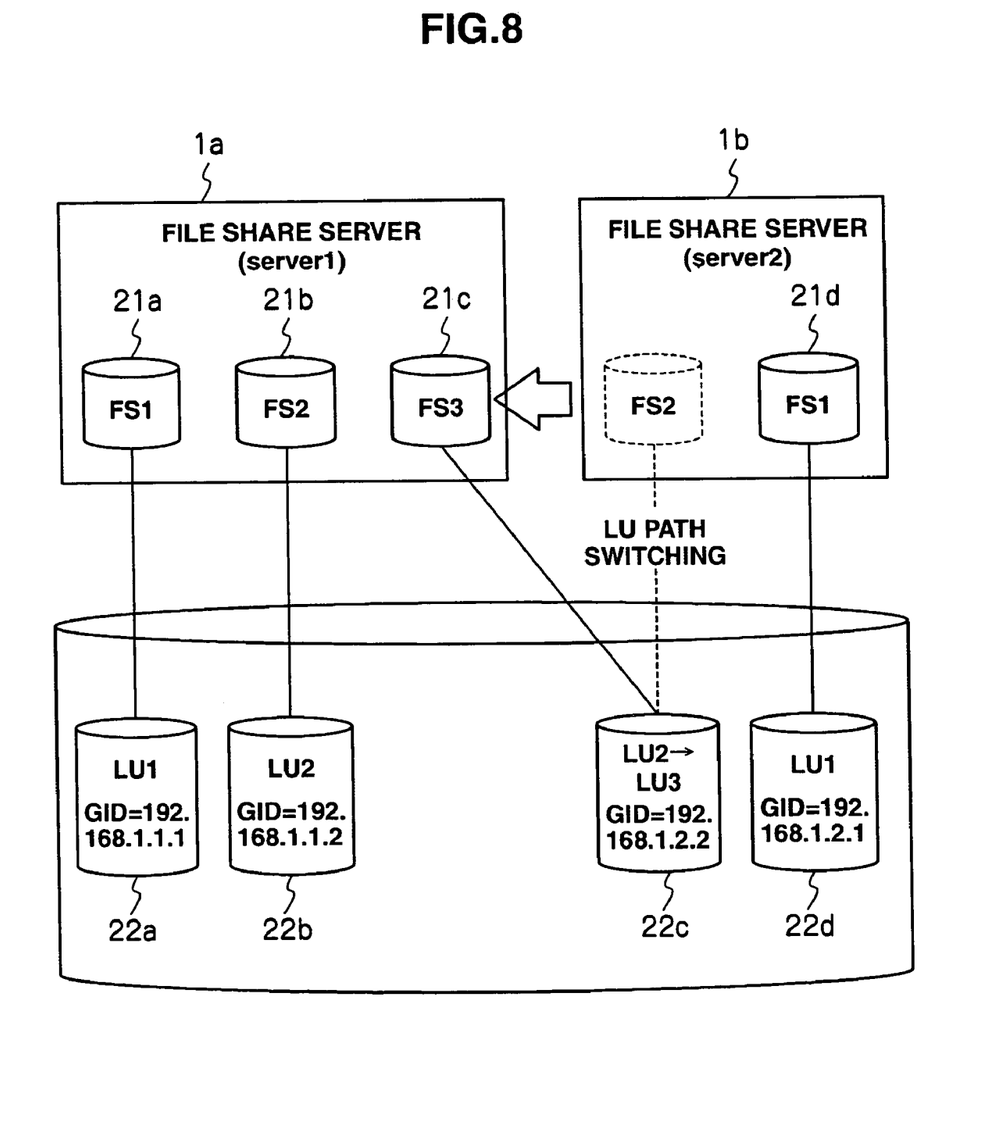
FIG. 8 is a schematic diagram illustrating LU migration.

As shown in FIG. 8, the LU for which the path is switched is identified with the file system ID=2 and LU number=2 in the migration source file server 1b, however, in the migration destination file share server 1a, both the file system ID 2 and the LU number 2 are already used, so different numbers are given (in the example of FIG. 8, the file system ID changes to 3 and the LU number changes to 3).

The migration destination file share server obtains a global ID from the management computer 3 and registers it in the file system management table (FIG. 3) when creating the file system.

Figure 9:
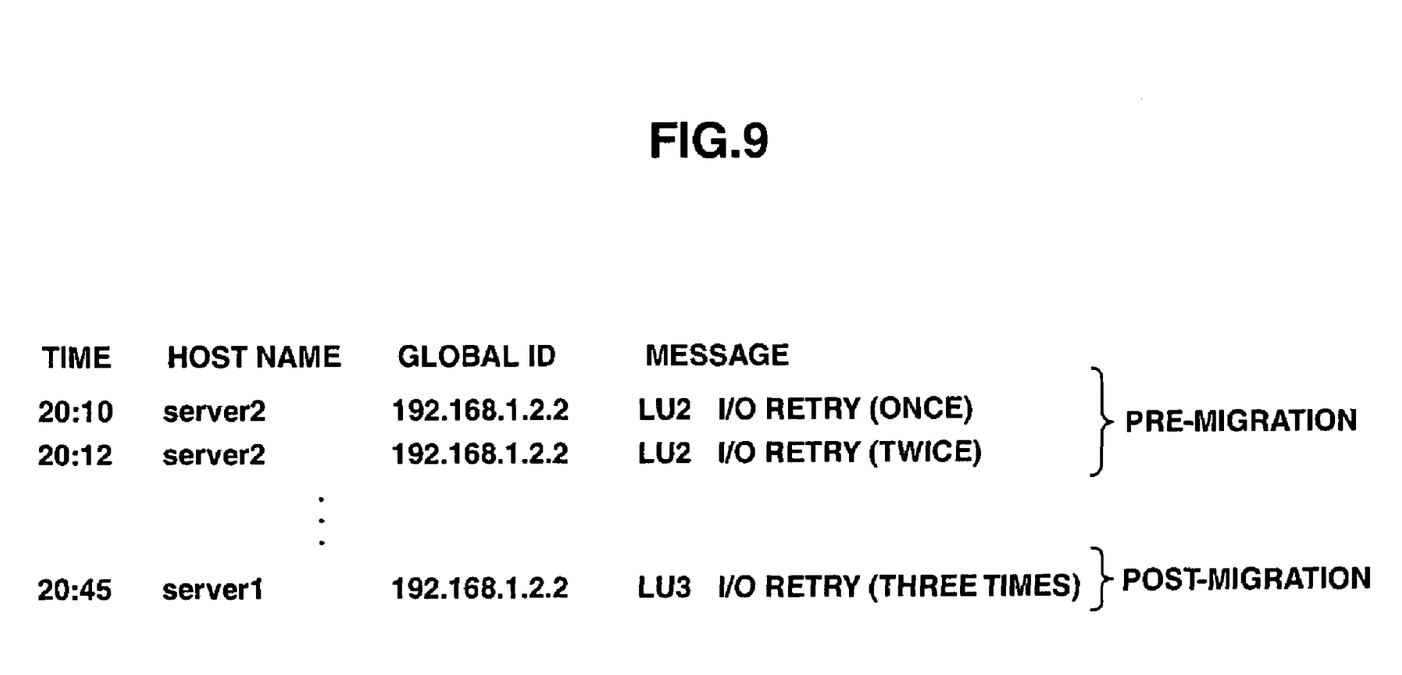
FIG. 9 shows a list of log messages.

FIG. 9 shows a list of log information for the LU for which the path has been switched, the information having been obtained before and after migration. The log information obtained from the migration source file share server and the log information obtained from the migration destination file share server have different LU numbers, however, both pieces of log information have the same global ID, so it can be understood that the log information is about logins or logouts for the same LU.

In the present example, the number of I/O retries to the LU is output as the log information, therefore, from the log information, it can be understood that I/O retries have been conducted in the migration source file share server.

Figure 10:
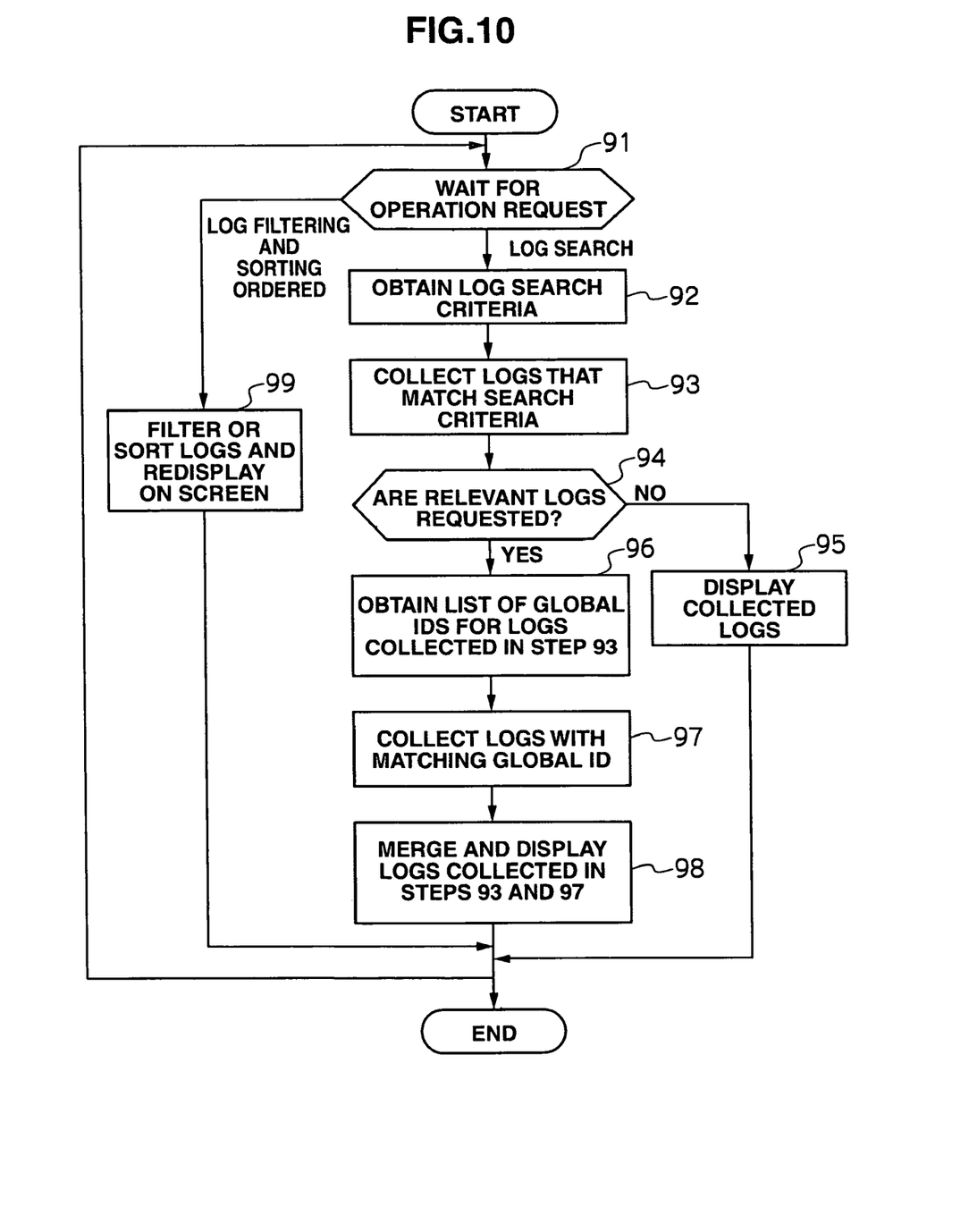
FIG. 10 is an operation flow for a log data analysis program.

FIG. 10 shows an operation flow for the log analysis program 106 in the management computer 3. The log analysis program 106 waits for an operation instruction from the administrator (step 91). When the administrator requests a log search, the log analysis program obtains log search criteria and collects log messages that match the search criteria from the external storage apparatus 20 (steps 92 and 93).

If the administrator does not request collection of relevant logs, the log analysis program displays the collected logs on the screen (steps 94 and 95). If the administrator does request collection of relevant logs, it obtains a list of the global IDs set for the collected log messages (step 96) and again collects log messages having a global ID matching the LU's global ID from the external storage apparatus (step 97). Then, it merges the log messages collected in steps 93 and 97 and displays them on the screen (step 98).

Figure 11:
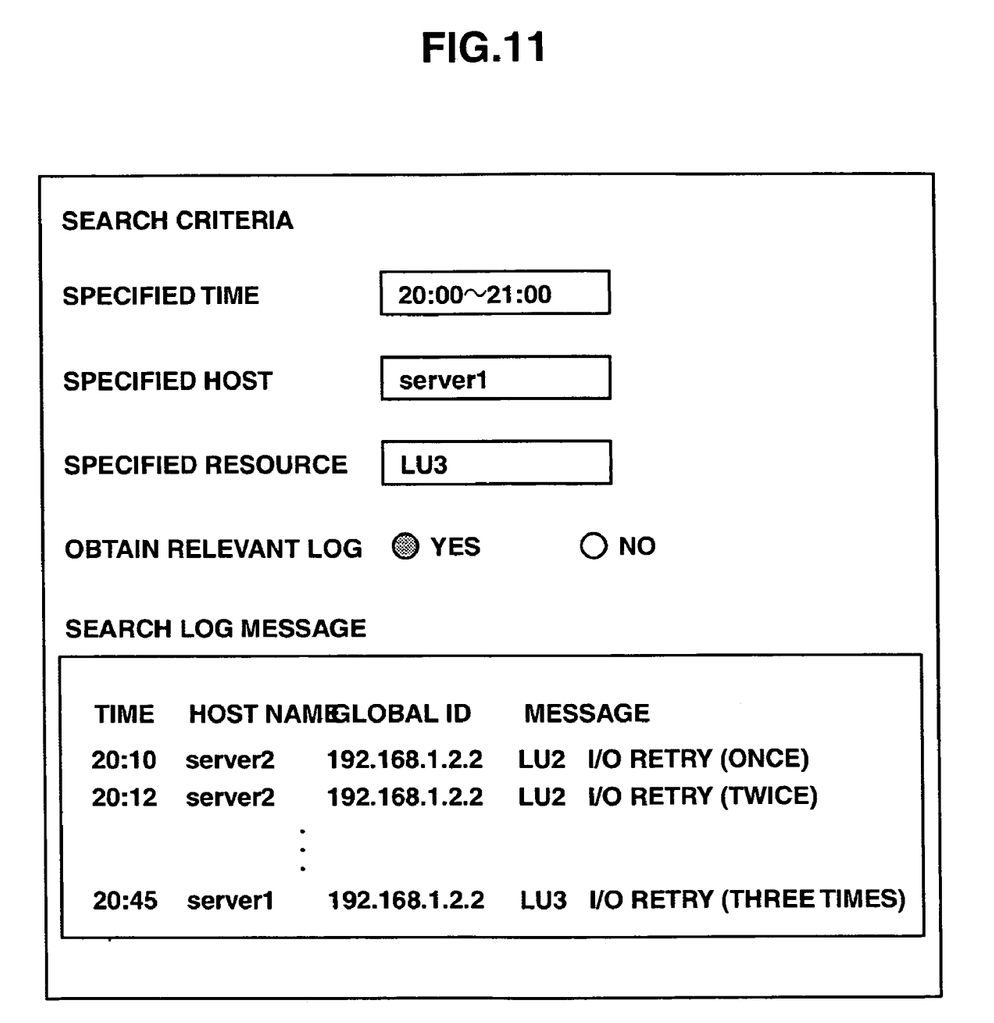
FIG. 11 shows a screen showing a log information analysis result.

Following these steps, as shown in FIG. 11 for example, if the administrator requests log analysis according to only the name of the file share server (server1) 1a and the LU number (LU3), all log information for the same LU can be searched for.

Moreover, when the administrator orders filtering and sorting of the log information displayed on the screen according to global ID, the log analysis program redisplays the log messages according to specified filtering and sorting criteria, thereby providing necessary log information to the administrator in an easy-to-read manner (steps 91 and 99).

Figure 12:
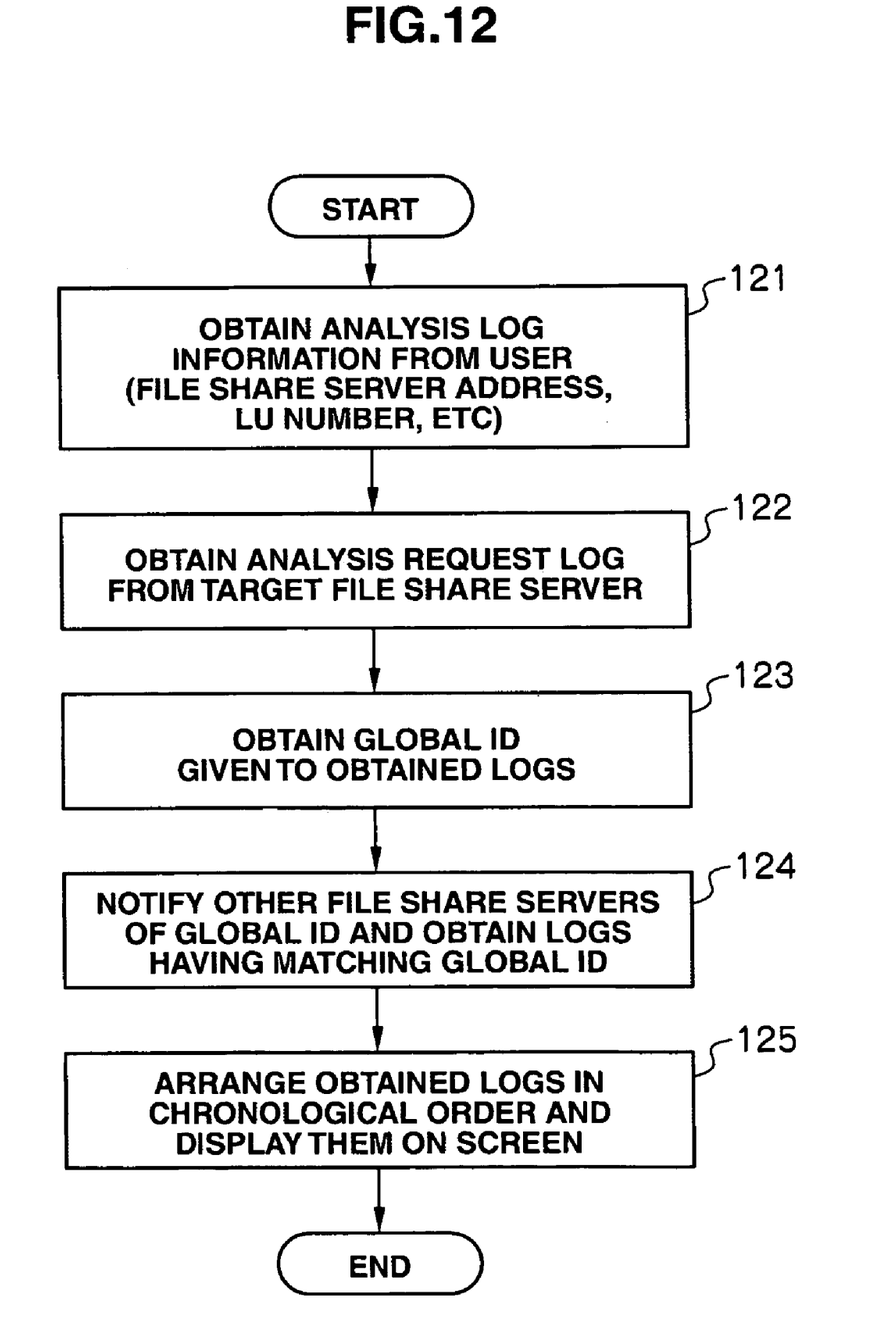
FIG. 12 is another operation flow for the log information analysis program.

FIG. 12 shows an operation flow for the log analysis program 106. Different from the operation flow shown in FIG. 10, the operation flow in FIG. 12 aims to store log data in a local memory disk in a file share server and fetch and transmit requested log data to the management computer as requested by the management computer, The log analysis program 106 in the management computer 3 obtains analysis log information from a user (client computer) (step 121). The analysis log information is information for a target related to the to-be-analyzed log information, such as an address of a file share server and an LU number.

The log analysis program obtains analysis-requested log information from a local storage resource in a target file share server 1a (step 122). It then obtains the global ID given to the obtained log information (step 123), notifies other file share servers 1b of the global ID, and obtains log information having a matching global ID (step 124). Consequently, all log information for the same LU in the migration source and migration destination file share servers can be extracted. The obtained logs are arranged in a chronological order and displayed on the screen (step 125).

Figure 13:
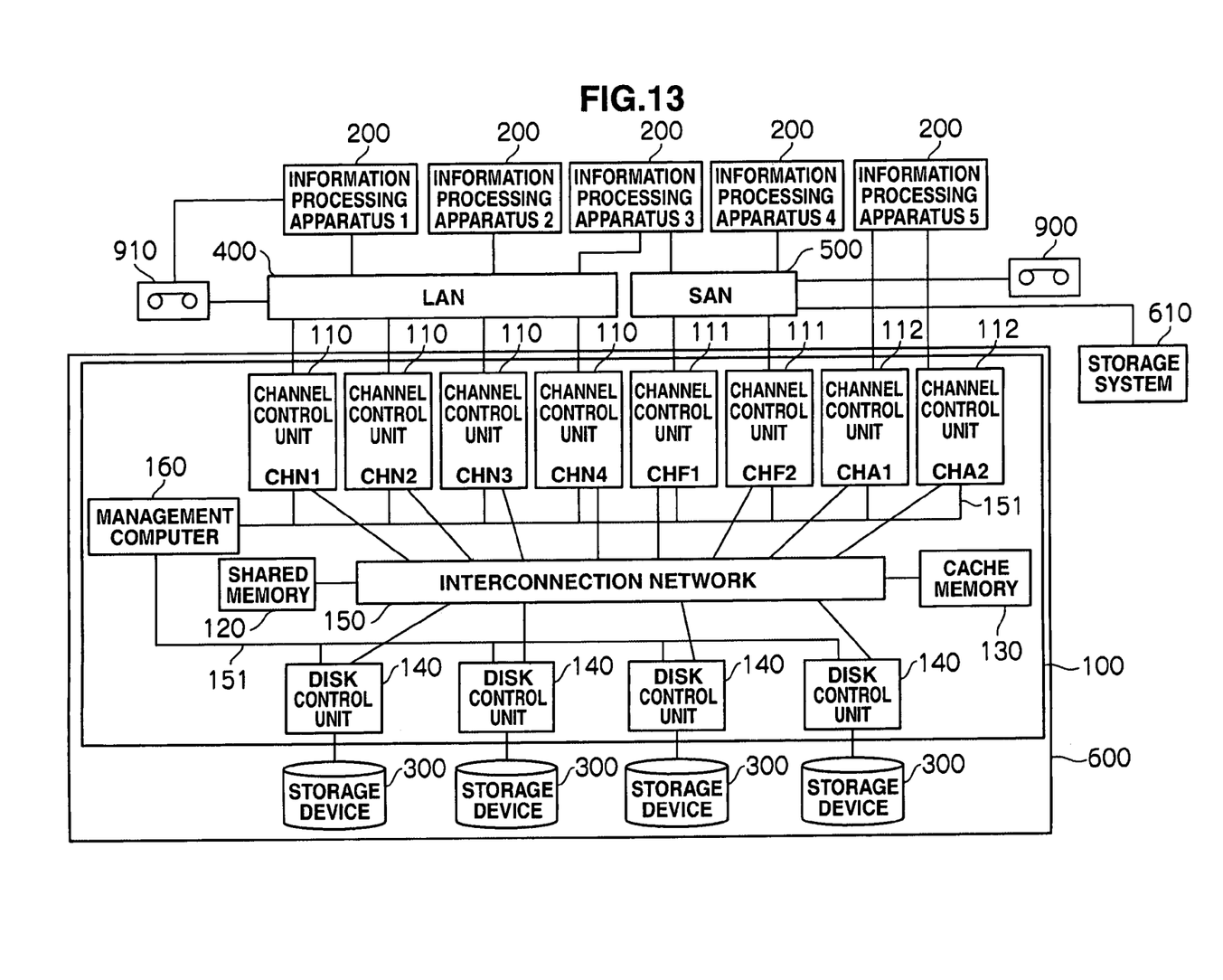
FIG. 13 shows a hardware structure where file share servers in FIG. 1 are incorporated in a high-end storage system.

FIG. 13 shows a functional block diagram of a computer system where the file share servers 1a and 1b in FIG. 1 are incorporated in a high-end storage system 600. Components in FIG. 13 are explained, also mentioning their correspondence relationships with the components in FIG. 1.

A storage system 600 is structured with: a plurality of storage devices 300; and a storage device control apparatus 100 for controlling input and output of data to/from the storage devices 300 in response to input/output requests from information processing apparatuses (210 to 250). The storage devices correspond to the storage apparatus 6 in FIG. 1.

The information processing apparatuses 1 to 3 (210 to 230) are connected to the storage system 600 via a LAN 400. They transmit file name-specified data access requests (requests for input/output of data in files, hereinafter called the "file access requests") to channel control units CHN1 to CHN4 (110) in the storage system 600. The channel control units will be explained later. The information processing apparatuses 1 to 3 correspond to the aforementioned client computer 2a and the management computer 3.

A backup device 910 is also connected to the LAN 400. The backup device 910 communicates with the storage device control apparatus 100 via the LAN 400, thereby storing backup data of the data stored in the storage devices 300.

The storage device control apparatus 100 includes the channel control units CHN1 to CHN4 (110). Via the channel control units CHN1 to CHN4 (110), the storage device control apparatus 100 relays write accesses or read accesses between the information processing apparatuses 1 to 3 as well as the backup device 910 and the storage devices 300. The channel control units CHN1 to CHN4 (110) individually accept file access requests from the information processing apparatuses 1 to 3. Specifically, the channel control units CHN1 to CHN4, each assigned a network address (for example, an IP address) on the LAN 400 and corresponding to the file share servers 1a in FIG. 1, act as NAS to provide NAS services to the information processing apparatuses 1 to 3.

Because the channel control units CHN1 to CHN4 providing NAS services are included in the single storage system 600, NAS servers that have conventionally been provided in separate independent computers are integrated in a single storage system 600. Accordingly, centralized management of the storage system 600 becomes possible and efficiency in maintenance operations, such as various setting and controls as well as failure management and version management, can be promoted.

Information processing apparatuses 3 and 4 (230 and 240) are also connected to the storage device control apparatus 100 via a SAN 500. The SAN 500 is a network for transmitting, between the storage devices 300 and the information processing apparatuses 3 and 4, data in blocks that are management units in storage areas provided by the storage devices 300.

Communication between the information processing apparatuses 3, 4 and the storage device control apparatus 100 via the SAN 500 is generally made according to Fibre Channel Protocol. A SAN-compatible backup device 900 is also connected to the SAN 500.

The storage device control apparatus 100 also includes channel control units CHF1 and CHF2 (111) in addition to the aforementioned channel control units CHN1 to CHN4. The storage device control apparatus 100 communicates with the information processing apparatuses 3 and 4 and the SAN-compatible backup device 900 via the channel control units CHF1 and CHF2 (111) and the SAN 500.

An information processing apparatus 5 (250) is also connected to the storage device control apparatus 100, without involving a network such as the LAN 400 or the SAN 500. Incidentally, another storage system 610, which is located at a site (secondary site) away from the site (primary site) of the storage system 600, is connected to the SAN 500. The storage system 610 is used as a data replication destination apparatus for data replication or remote copy.

By having the channel control units CHN1 to CHN4 (110), the channel control units CHF1 and CHF2 (111), and the channel control units CHA1 and CHA2 (112) in the storage system 600 in a mixed state, the storage system 600 can be connected to various kinds of networks. In other words, the storage system 600 is a SAN-NAS combined storage system where the storage system 600 is connected to the LAN 400 via the channel control units CHN1 to CHN4 and to the SAN 500 via the channel control units CHF1 and CHF2.

An interconnection network 150 connects the respective channel control units 110 to 112, shared memory 120, cache memory 130, and disk control units 140 to one another. Transmission of commands and data between them is performed via the interconnection network 150. The interconnection network 150 is configured with a high-speed bus such as an ultrahigh-speed crossbar switch that transmits data by high-speed switching. The interconnection network 150 switches among paths between NAS file systems and the logical units provided by the storage devices 300.

The shared memory 120 and the cache memory 130 are memory apparatuses shared by the channel control units 110 to 112 and the disk control units 140. The shared memory 120 is mainly used for storing control information and commands while the cache memory 130 is mainly used for storing data. The disk control units 140 always monitor the shared memory 120 and when they determine that a write command has been written in the shared memory 120, the relevant disk control unit 140 reads write data from the cache memory 130 and writes it in the storage devices 0.300 according to the write command.

Meanwhile, if the data input/output command a channel control unit (110, 111 or 112) receives from an information processing apparatus (210, 220, 230, 240 or 250), is a read command, the channel control unit writes the read command in the shared memory 120 and checks whether the read target data exists in the cache memory 130.

The disk control units 140 convert logical address-specified data access requests transmitted from the channel control units 110 to 112 to the storage devices 300 to physical address-specified data access requests, and write or read data in or from the storage devices 300 in response to I/O requests output from the channel control units 110.

The storage devices 300 are equipped with one or more disk drives (physical volumes) and provide storage areas that can be accessed from the information processing apparatuses (210 to 250). Logical units, where storage spaces of one or more physical volumes are combined, are set for the storage areas provided by the storage devices 300. The logical units set for the storage devices 300 include user logical units that can be accessed from the information processing apparatuses (210 to 250) and system logical units used for controlling the channel control units 110 to 112.

The logical units allocated to the physical volumes provided by the storage devices 300 can be accessed from the channel control units 110. The channel control units 110 may share the same logical unit. A management computer may be incorporated in the storage system. A management computer 160 is for maintaining and managing the storage system 600 and is connected to the respective channel control units 110 and the disk control units 140 via an internal LAN 151. By operating the management computer 160, an operator can set disk drives in the storage devices 300, set logical units, and install micro programs that are run by the channel control units 110 to 112 and the disk control units 140.

Incidentally, as already described in the explanation for the embodiment, a log management module is realized by the log management program in the file share server 1a and 1b and the log analysis program 106 and the log management program 104 in the management computer 3. A resource management module is realized by the file share program 102 and the file system program 103 in the file share servers 1a and 1b and the system management program 107 in the management computer 3. A path control program is realized by the file system program 102 in the file share server 1a and 1b and the system management program 107 in the management computer 3. The embodiment explained so far is merely an example and may be changed as appropriate as long as it does not deviate from the gist of the present invention.

What is claimed is:

1. A computer system comprising:

a plurality of physical disk drives;

a plurality of file share servers each including a file share program, a file system program, and a first log management program, the file share program and the file system program operating to obtain log information in response to an access request from a client computer, the file system program operating to obtain a first respective unique ID of a first logical unit requested by the access request and associate a first log message with the first respective unique ID, the first log message including a first area where an acquisition time of the access request from the client computer is entered, a second area where a name of the client computer is entered, a third area where the first respective unique ID is entered, and a fourth area where a memory location for the first log message is entered;

a plurality of logical units each configured upon the physical disk drives and mapped onto the plurality of file share servers, the plurality of logical units including the first logical unit;

a management computer for managing the plurality of file share servers, the management computer including a local memory storing a second log management program and a log analysis program for managing logs, the second log management program storing log information transferred from the plurality of file share servers, the second log management program receiving the first log message from the first log management program, the log analysis program collecting log messages that match a set of specified search criteria from an external memory in a collection of log messages and, upon receiving a request for the collection of log messages, obtaining a list of respective unique IDs entered into each log message of the collection of log messages, collecting a set of log messages from the external memory that having a matching global ID with a specified logical unit of the plurality of logical units, merging the collection of log messages and the set of log messages, and displaying the merged log messages on a display screen;

a resource management module for giving a respective unique ID within the computer system to each logical unit of the plurality of logical units and managing each logical unit of the plurality of logical units while maintaining the respective unique ID of the logical unit when the logical units is migrated between file share servers of the plurality of file share servers, the resource management module being realized by the file share program and the file system program included in each of the file share servers of the plurality of file share servers; and a log management module for associating log information with the respective unique ID of each logical unit of the plurality of logical units and managing log information for each logical unit of the plurality of logical units obtained before and after migration of the logical unit using the respective unique ID of the logical unit, the log management module being realized by the first log management program included in each of the file share servers of the plurality of file share servers and the second log management program and the log analysis program included in the local memory of the management computer, wherein, during an ordered migration of a selected logical unit of the plurality of logical units mapped to the first file share server to a second file share server, if another logical unit having the same respective unique ID as the respective unique ID of the selected logical unit is mapped to the second file share server, the log management module assigns a new respective unique ID to the selected logical unit that is distinct from the respective unique ID of each other logical unit that is mapped to the second file share server, assigns a new global ID to the log information obtained for the selected logical unit before the ordered migration, and assigns the new global ID to the log information obtained for the selected logical unit after the ordered migration.

2. The computer system according to claim 1, wherein each of the file share servers is configured with a file system, and a mapping destination of said one logical unit is changed when migration is conducted.

3. The computer system according to claim 1,
wherein the respective unique ID of a third logical unit of the plurality of logical units is configured with an IP address of the first file share server to which the third logical unit is mapped before migration, and
wherein the respective unique ID of the third logical unit does not change before or after migration.

4. The computer system according to claim 1,
wherein the global ID of a third logical unit of the plurality of logical units is configured with a MAC address of the first file share server in which the third logical unit is mounted before migration, and
wherein the respective unique ID of the third logical unit does not change before or after migration.

5. A computer system comprising:
a plurality of file share servers each having file systems shared between host computers, each file share server including a file share program, a file system program, and a first log management program, the file share program and the file system program operating to obtain log information in response to an access request from a client computer, the file system program operating to obtain a first respective unique ID of a first logical unit requested by the access request and associate a first log message with the first respective unique ID, the first log message including a first area where an acquisition time of the access request from the client computer is entered, a second area where a name of the client computer is entered, a third area where the first respective unique ID is entered, and a fourth area where a memory location for the first log message is entered;
a storage apparatus having a plurality of physical disk drives and providing a plurality of logical units each configured upon the physical disk drives to the plurality of file share servers, the plurality of logical units including the first logical unit;

a path connection module for setting paths between the plurality of logical units and the file systems of the plurality of file share servers;

a management module managing the plurality of file share servers and including a local memory storing a second log management program and a log analysis program for managing logs, the second log management program storing log information transferred from the plurality of file share servers, the second log management program receiving the first log message from the first log management program, the log analysis program collecting log messages that match a set of specified search criteria from an external memory in a collection of log messages and, upon receiving a request for the collection of log messages, obtaining a list of respective unique IDs entered into each log message of the collection of log messages, collecting a set of log messages from the external memory that having a matching respective global ID with a specified logical unit of the plurality of logical units, merging the collection of log messages and the set of log messages, and displaying the merged log messages on a display screen;

a resource management module for giving a respective global ID within the computer system to each of the logical units and managing said each logical unit while maintaining the respective global ID of each logical unit when the logical unit is migrated between file share servers of the plurality of file share servers, the resource management module being realized by the file share program and the file system program included in each of the file share servers of the plurality of file share servers; and a log management module for associating log information for each logical unit of the plurality of logical units with the respective global ID of the logical unit and managing the log information for each logical unit in a migration source file system and log information for the same logical unit in a migration destination file system using the respective global ID of the logical unit, the log management module being realized by the first log management program included in each of the file share servers of the plurality of file share servers and the second log management program and the log analysis program included in the local memory of the management computer, wherein, during an ordered migration of a selected logical unit of the plurality of logical units mapped to the first file share server to a second file share server, if another logical unit having the same respective unique ID as the respective unique ID of the selected logical unit is mapped to the second file share server, the log management module assigns a new respective unique ID to the selected logical unit that is distinct from the respective unique ID of each other logical unit that is mapped to the second file share server, assigns a new global ID to the log information obtained for the selected logical unit before the ordered migration, and assigns the new global ID to the log information obtained for the selected logical unit after the ordered migration.

6. The computer system according to claim 5, wherein the log management module obtains analysis log information from a user, obtains an analysis-requested log from a target one of the file share servers, notifies other ones of the file share servers of the respective global ID given to the obtained log information, and obtains log information having a matching respective global ID.

7. The computer system according to claim 5, wherein the log management module arranges all of the obtained log information having a matching global ID in chronological order and displays it on a screen.

8. A method for managing log information within a computer system including physical disk drives, file share servers and a management server, comprising the steps of:

configuring by the management server a plurality of logical units upon the physical disk drives and mapping by the management server each of the logical units onto one of the file share servers;

giving by the management server a respective unique ID within the computer system to each of the logical units and migrating one of the logical units having a first respective unique ID from one of the file share servers to another one of the file share servers;

maintaining by the management server the first respective unique ID of said one logical unit when migrating said one logical unit if another logical unit having the same respective unique ID as the respective unique ID of the one logical unit is not mapped to the other file share server;

if another logical unit having the same respective unique ID as the respective unique ID of the one logical unit is mapped to the other file share server, assigning a new respective unique ID to the one logical unit that is distinct from the respective unique ID of each other logical unit that is mapped to the other file share server;

if another logical unit having the same respective unique ID as the respective unique ID of the one logical unit is mapped to the other file share server, assigning a new global ID to the log information obtained for the one logical unit before the migration and the new global ID to the log information obtained for the one logical unit after the migration;

associating by the management server log information with the first respective unique ID and managing the log information for said one logical unit before and after migration using the first respective unique ID;

obtaining log information in response to an access request from a client computer;

associating a second respective unique ID of a second logical unit requested by the access request with a first log message that includes a first area where an acquisition time of the access request from the client computer is entered, a second area where a name of the client computer is entered, a third area where the second respective unique ID is entered, and a fourth area where a memory location for the first log message is entered;

collecting log messages that match a set of specified search criteria from an external memory in a collection of log messages;

obtaining a list of respective unique IDs entered into each log message of the collection of log messages,;

collecting a set of log messages from the external memory that having a matching global ID with a specified logical unit of the plurality of logical units;

merging the collection of log messages and the set of log messages; and displaying the merged log messages on a display screen.

* * * * *